P. W. PRUTZMAN.
APPARATUS FOR WASHING INSOLUBLE POWDERS.
APPLICATION FILED AUG. 20, 1921.

1,426,099.

Patented Aug. 15, 1922.

INVENTOR;
PAUL W. PRUTZMAN,
BY
ATTORNEYS.

UNITED STATES PATENT OFFICE.

PAUL W. PRUTZMAN, OF LOS ANGELES, CALIFORNIA, ASSIGNOR TO GENERAL PETROLEUM CORPORATION, A CORPORATION OF CALIFORNIA.

APPARATUS FOR WASHING INSOLUBLE POWDERS.

1,426,099.   Specification of Letters Patent.   Patented Aug. 15, 1922.

Application filed August 20, 1921. Serial No. 493,985.

*To all whom it may concern:*

Be it known that I, PAUL W. PRUTZMAN, a citizen of the United States, residing at Los Angeles, in the county of Los Angeles and State of California, have invented a new and useful Apparatus for Washing Insoluble Powders, of which the following is a specification.

My invention relates to methods of removing soluble foreign elements or impurities from insoluble powdered substances, and is particularly adapted to the revitalization of absorbent materials such as are commonly used in the oil refining industries.

When insoluble powdered substances are washed with solvents for the removal of such impurities as may be soluble in the solvent used, it is customary to mix the solvent with the substance to be washed by the use of agitating paddles or screws, or by one of the well known types of mixers. The solvent and the impurities which it has dissolved are thereafter separated from the powder by resorting to any of the commonly used processes of filtration or settlement.

These methods are sufficiently economical to justify their use where the solvent is extremely cheap, but in cases where organic solvents must be used, as is necessary in revitalizing absorbents which have been used in purifying oils, the ordinary losses of the solvents due to vaporization and other causes adds materially to the cost of the operation. Also, where the impurities are only slowly soluble in the solvent, a great many applications of the solvent are required to entirely free the absorbent of impurities, with the result that not only do the losses mount up rapidly, but the washing apparatus becomes extremely heavy and expensive.

There are in use at the present time several different types of continuous reflux apparatus which are of varying efficiency according to the size of granules of the powders being washed. Where the powders are exceedingly fine, a gummy mass forms upon the filter screens and prevents the passage of the solvent therethrough. This gummy mass must be scraped off before the apparatus will again properly function, this being very detrimental to the life of the filter cloth.

It is an object of my invention to provide the continuous operation of the solvent upon the material being washed, which object is attained by the method of using the solvent in my apparatus which provides for the continuous separation of the solvent from the material.

It is a further object of my invention to bring the solvent into more thorough and extensive contact with the material being washed, thus increasing the rate of performance of the process.

A further object of my invention is the elimination of the disadvantages of the present methods by employing greater freedom in the use of the solvents which is made possible by the use of my method of progressive utilization of the solvent by conducting same successively through interconnected washers in which the washing operation exists in lesser stages of completion.

Other objects and advantages will be made evident hereinafter.

Referring to the drawings which are for illustrative purposes only,

Figure 1:
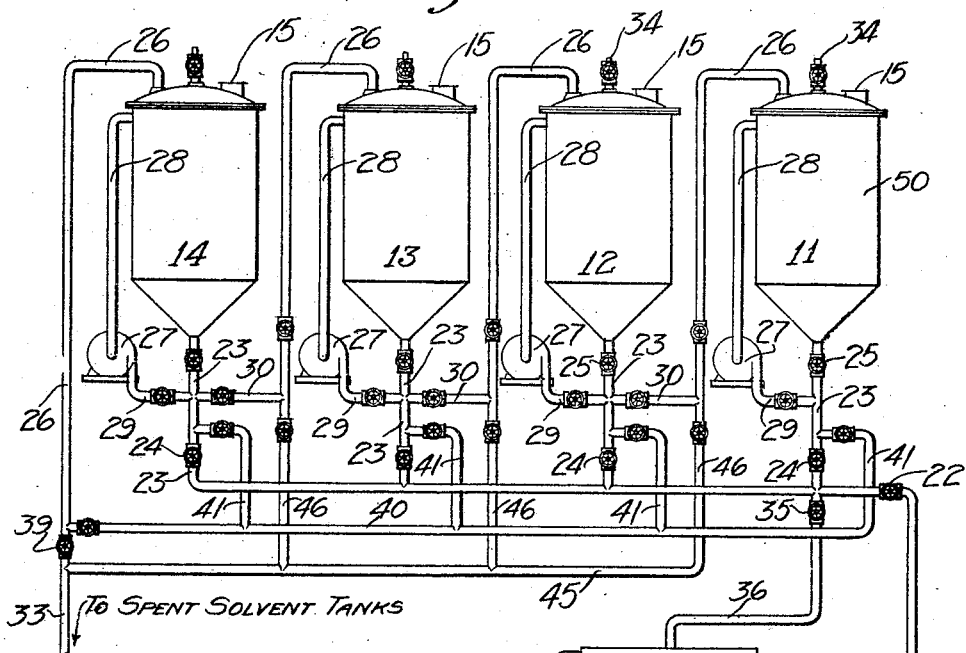
Fig. 1 is a diagrammatic view showing an apparatus which may be used in the practice of my invention.

A suitable form of apparatus, as shown in Fig. 1 of the drawing, consists of a number of suitably interconnected washers 11, 12 and 13 and 14, into which the material to be washed is fed through manholes 15. After each of the washers has been charged, the manholes are covered and a feed pump 20 is started, drawing clean solvent from a storage tank 21 and delivering same to the washer 11 through a stop valve 22 and piping 23 leading into the washer 11 and having in it valves 24 and 25. As soon as the washer 11 is filled and the solvent starts to overflow through piping 26 leading therefrom, a suitable agitating means is started. This agitating means may be any of the paddle or screw arrangements commonly used for mixing liquids with solids, or it may be the improved means which I have illustrated in the drawing, consisting of a pump 27 preferably of the centrifugal type, which draws the liquid from a point near the top of the washer through a pipe 28 and discharges same through piping 29 and a portion of the pipe 23, into the cone bottom of the washer, thus keeping the contents of the washer in a controllable state of agitation.

The liquid flowing out of the washer 11 passes through piping 26, as heretofore mentioned, and is delivered into the bottom of the washer 12 through a pipe 30 leading into the pipe 23 which has connection with the bottom of the washer 12. From the washer 12 the solvent overflows successively into the washers 13 and 14 through systems of interconnecting piping duplicating that which connects between the washers 11 and 12. As each of the washers becomes filled, the circulating pumps 27 connected therewith are put into operation to maintain the contents of the washers in constant agitation.

In its passage through the four washers, the solvent has taken up more or less of the soluble impurities from the material with which the washers are charged, the strength of the solution leaving the washer 14 through the overflow pipe 26 leading therefrom being controlled by the rate of flow of the solvent and the relative solubility in such solvent of the soluble material. The then more or less saturated solvent is conducted through piping 33 into a spent solvent tank, not shown, and may be discarded as of no value, or it may be recovered by distillation.

When the impurities are entirely washed out of the material placed in the washer 11, the supply of solvent from the storage tank 21 is discontinued, the vent 34 and the valve 35 in the piping 36 leading into a pulp tank 37 are opened and the contents of the washer 11 is precipitated into the pulp tank 37. It is to be understood that all valves not having been heretofore designated as open are in the closed position. The valve 24 in the line 23 leading into the washer 11 is closed and the washer is again filled with impurity laden material. The valve 35 is again closed and the valve 24 in the line 23 leading into the washer 12 is opened so that when the pump 20 is again started the fresh solvent will be directed into the washer 12. The valve 39 is closed and the solvent from the washer 14 is directed through a manifold 40 and a riser 41 into the piping 23 of the washer 11 and the overflow from the washer 11 is directed into a manifold 45 through piping 46 and from thence is carried on by the piping 33 to the spent solvent tank. In this manner I am able to preserve the rotation of the washing process and as the contents of each starting washer is washed clean it is discharged into the pulp tank, as previously described, and the process is started with each succeeding washer after the discharged washer is refilled with impurity laden material.

The pulp drier 37 is provided with paddles and may be any type of drier suitable to the nature of the solvent and of the solid material. The particular type of drier used is not a part of this invention, the function thereof being merely to remove the solvent from the washed material. The vapors from the pulp drier may be recovered by passing same through a condenser 50, the condensed solvents thereupon being returned to the storage tank 21.

The essential features of my invention reside in the circulation of the solvent upward instead of downward or laterally through the mass of powdered material, as heretofore practised, thus keeping the material in a more or less agitated condition, and avoiding the formation of a solid and impenetrable mass of wet powder upon the filter screen. To these essential features are added the additional features of controllably agitating the contents of the washers without the use of outside driven stirrers or paddles; the arrangement and interconnection of the washers in a manner that will permit the operation of a suitable number of the washers in successive order, thereby deriving the greatest utility from the amount of solvent used; and the feature of handling the powered materials in suspension in the solvent, instead of merely combining the two in the form of a paste, as is common practice, and thereafter conveying this liquid mixture into a drier in which the solvent is driven off and a dry powder left behind.

Figure 2:
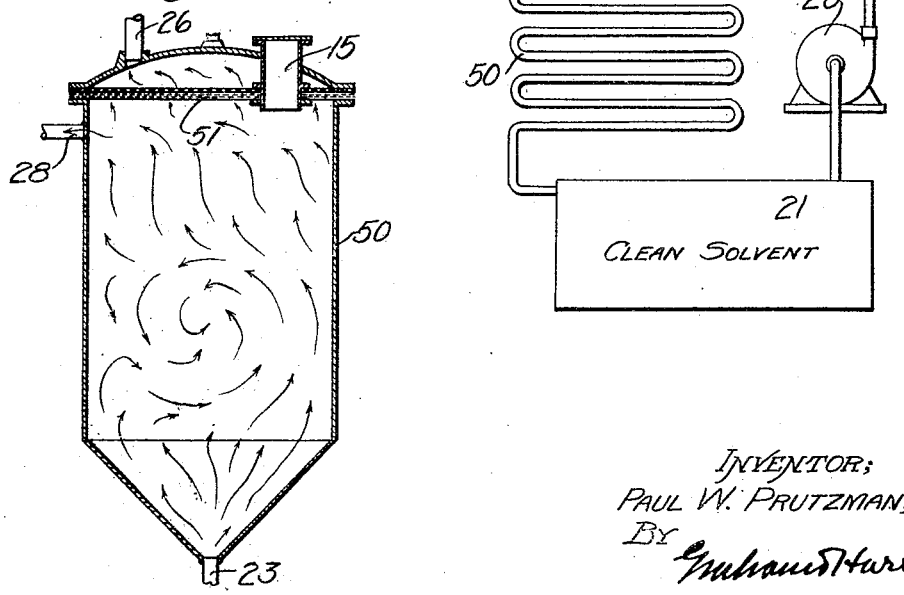
Fig. 2 is a vertical section through one of the washing shells shown in Fig. 1.

In combination with the feature of circulating the solvent upward within the washer, I employ a separating screen as illustrated in Fig. 2. In the upper portion of the shell 50, which constitutes a part of the washer shown, I interpose a filter screen 51 which may be of any of the common forms of construction. The screens 51 may be conveniently installed beneath the cover 52 as I have shown, but it is not entirely necessary that the same should be in the horizontal position shown. The solvent entering the washer through the pipe 23 forms a mixture with whatever materials are placed therein and the continued circulation of the solvent maintains a turbulent condition of the contents of the washer. The heavier particles remain near the bottom of the washer while the extremely fine particles are carried in suspension in the solvent to the upper portion of the washer. By this arrangement, only a small amount of the powder is brought into contact with the screen 51, and the filter cake formed upon the screen becomes detached therefrom due to the collective weight of the component particles and drops back into and is further agitated with the solvent. The filter screen 51 is ideally located as shown in Fig. 2, but any position of inclination may be adopted which will allow the weight of the particles collected thereupon to be exerted in a direction to cause the breaking away of the filter cake into the turbulent contents of the washer, thus leaving the filter screen unincumbered.

I claim as my invention:

1. In an apparatus for washing insoluble powdered substances, the combination of: a shell for containing a mass of powdered substance; means for circulating a solvent upward through said mass of powdered substance; and means for carrying off the overflow solvent from said shell.

2. In an apparatus for washing insoluble powdered substances, the combination of: a shell for containing a mass of powdered substance; means for circulating a solvent upward through said mass of powdered substance; means for agitating said mass and said solvent as said solvent passes upward through said mass; and means for carrying off the overflow solvent from said shell.

3. In an apparatus for washing insoluble powdered substances, the combination of: a shell for containing a mass of powdered substance; means for circulating a solvent upward through said mass of powdered substance; means for carrying off the overflow solvent from said shell; and filtering means substantially above said mass to prevent the passage from said shell of suspended solid matter from said mass.

4. In an apparatus for washing insoluble powdered substances, the combination of: a shell for containing a mass of powdered substance; means for circulating a solvent upward through said mass of powdered substance; means for agitating said mass and said solvent as said solvent passes upward through said mass; means for carrying off the overflow solvent from said shell; and filtering means substantially above said mass to prevent the passage from said shell of suspended solid matter from said mass.

5. In an apparatus for washing insoluble powdered substances, the combination of: a shell for containing a mass of powdered substance; means for circulating a solvent upward through said mass of powdered substance; means for carrying off the overflow solvent from said shell; and filtering means substantially above said mass to prevent the passage from said shell of suspended solid matter from said mass, said filtering means being so placed that the filter cake formed thereupon may drop therefrom due to the collective weight of the particles of which the filter cake is composed.

6. In an apparatus for washing insoluble powdered substances, the combination of: a shell for containing a mass of powdered substance; means for circulating a solvent upward through said mass of powdered substance; means for agitating said mass and said solvent as said solvent passes upward through said mass; means for carrying off the overflow solvent from said shell; and filtering means substantially above said mass to prevent the passage from said shell of suspended solid matter from said mass, said filtering means being so placed that the filter cake formed thereupon may drop therefrom due to the collective weight of the particles of which the filter cake is composed.

7. In an apparatus for washing insoluble powdered substances, the combination of: a shell; a cover for said shell; a means of introducing a flow of solvent into the bottom of said shell; an overflow to carry off the solvent from said shell; and a filter means in the upper portion of said shell so placed that the solvent must pass therethrough in a substantially upward direction.

8. In an apparatus for washing insoluble powdered substances, the combination of: a shell; a cover for said shell; a means of introducing a flow of solvent into the bottom of said shell; an overflow to carry off the solvent from said shell; and a filter means extending across the upper portion of said shell in a substantially horizontal position.

9. In an apparatus for washing insoluble powdered substances, the combination of: a shell; a cover for said shell; a means of introducing a flow of solvent into the bottom of said shell; an overflow to carry off the solvent from said shell; means for agitating the contents of said shell; and a filter means in the upper portion of said shell so placed that the solvent must pass therethrough in a substantially upward direction.

10. In an apparatus for washing insoluble powdered substances, the combination of: a shell; a cover for said shell; a means of introducing a flow of solvent into the bottom of said shell; an overflow to carry off the solvent from said shell; means for agitating the contents of said shell; and a filter means extending across the upper portion of said shell in a substantially horizontal position.

11. In an apparatus for washing insoluble powdered substances, the combination of: a shell; a cover for said shell; a means of introducing a flow of solvent into the bottom of said shell; an overflow to carry off the solvent from said shell; means for agitating the contents of said shell, said means comprising a pump so connected with said shell as to draw liquid from the upper portion of said shell and to forcibly inject same into the bottom of said shell; and a filter means in the upper portion of said shell so placed that the solvent must pass therethrough in a substantially upward direction.

12. In an apparatus for washing insoluble powdered substances, the combination of: a shell; a cover for said shell; a means of introducing a flow of solvent into the bottom of said shell; an overflow to carry off the solvent from said shell; means for agitating the contents of said shell, said means comprising a pump so connected with said shell as to draw liquid from the upper portion of said shell and to forcibly inject same into the bottom of said shell; and a filter means extending across the upper portion of said shell in a substantially horizontal position.

13. In an apparatus for washing insoluble powdered substances, the combination of: a suitable number of shells; a means of introducing a flow of solvent into the bottoms of said shells; overflow pipes to carry off the solvent from said shells; a filter means extending across the upper portion of said shell so placed that the overflow solvent must pass therethrough in a substantially upward direction; interconnecting piping to carry the overflow from each of said shells to the succeeding shell; and piping whereby the fresh solvent may be introduced into either of the said shells.

14. In an apparatus for washing insoluble powdered substances, the combination of: a suitable number of shells; a means of introducing a flow of solvent into the bottoms of said shells; overflow pipes to carry off the solvent from said shells; means for agitating the contents of said shells; a filter means extending across the upper portion of said shell so placed that the overflow solvent must pass therethrough in a substantially upward direction; interconnecting piping to carry the overflow from each of said shells to the succeeding shell; and piping whereby the fresh solvent may be introduced into either of the said shells.

15. In an apparatus for washing insoluble powdered substances, the combination of: a suitable number of shells; a means of introducing a flow of solvent into the bottoms of said shells; means for agitating the contents of said shells, said means comprising a pump so connected with each of said shells as to draw liquid from the upper portion of said shell and to forcibly inject same into the bottom of said shell; a filter means extending across the upper portion of said shell so placed that the overflow solvent must pass therethrough in a substantially upward direction; interconnecting piping to carry the overflow from each of said shells to the succeeding shell; and piping whereby the fresh solvent may be introduced into either of the said shells.

In testimony whereof, I have hereunto set my hand at Los Angeles, California, this 13th day of August, 1921.

PAUL W. PRUTZMAN.